United States Patent [19]

Raguram et al.

[11] Patent Number: 5,724,263

[45] Date of Patent: Mar. 3, 1998

[54] AUTOMATIC TEMPOROSPATIAL PATTERN ANALYSIS AND PREDICTION IN A TELECOMMUNICATIONS NETWORK USING RULE INDUCTION

[75] Inventors: Sasisekharan Raguram, Somerset; V. Seshadri, Lincroft; Sholom M. Weiss, Highland Park, all of N.J.

[73] Assignee: AT&T Corp, Middletown, N.J.

[21] Appl. No.: 866,047

[22] Filed: May 30, 1997

Related U.S. Application Data

[63] Continuation of Ser. No. 587,062, Jan. 6, 1996, abandoned, which is a continuation of Ser. No. 140,780, Oct. 21, 1993, abandoned.

[51] Int. Cl.⁶ ...................................................... G06F 15/18
[52] U.S. Cl. ...................... 364/552; 395/200.53; 395/77; 395/917; 395/200.54
[58] Field of Search ...................... 364/552; 395/200.53, 395/500.54, 50, 51, 68, 75, 77, 917

[56] References Cited

U.S. PATENT DOCUMENTS

| | | | |
|---|---|---|---|
| 4,769,761 | 9/1988 | Downes et al. | 364/514 |
| 4,872,122 | 10/1989 | Altschuler et al. | 395/77 |
| 5,063,523 | 11/1991 | Vrenjak | 364/514 |
| 5,107,497 | 4/1992 | Lirov et al. | 395/75 |
| 5,179,634 | 1/1993 | Matsunaga et al. | 395/75 |
| 5,197,115 | 3/1993 | Sueda et al. | 395/68 |
| 5,243,543 | 9/1993 | Notess | 364/514 |
| 5,261,086 | 11/1993 | Shiramizu | 395/75 |
| 5,282,261 | 1/1994 | Skeirik | 395/68 |
| 5,295,230 | 3/1994 | Kung | 395/75 |
| 5,329,612 | 7/1994 | Kakazu et al. | 395/75 |
| 5,377,196 | 12/1994 | Godlew et al. | 395/917 |
| 5,440,672 | 8/1995 | Araki et al. | 395/51 |
| 5,465,320 | 11/1995 | Enbutsu et al. | 395/77 |
| 5,504,840 | 4/1996 | Hiji et al. | 395/77 |
| 5,528,730 | 6/1996 | Yagi et al. | 395/51 |
| 5,581,664 | 12/1996 | Allen et al. | 395/51 |

OTHER PUBLICATIONS

"Case–Based Reasoning from DARPA: Machine Learning Program Plan", Proceedings Workshop on Case–Based Reasoning, May 1989, pp. 1–13.

Weiss et al., "Reduced Complexity Rule Induction", Proceedings of the International Joint Conference on Artificial Intelligence, 1991, pp. 678–684.

*Primary Examiner*—Ellis B. Ramirez
*Assistant Examiner*—Eric W. Stamber
*Attorney, Agent, or Firm*—Stuart H. Mayer

[57] ABSTRACT

A facility is provided for enhancing an operations support system so that, based on data generated as a result of an event occurring in an associated telecommunications network, the operations support system can predict the likelihood of the event occurring again in the network.

10 Claims, 3 Drawing Sheets

FIG. 1

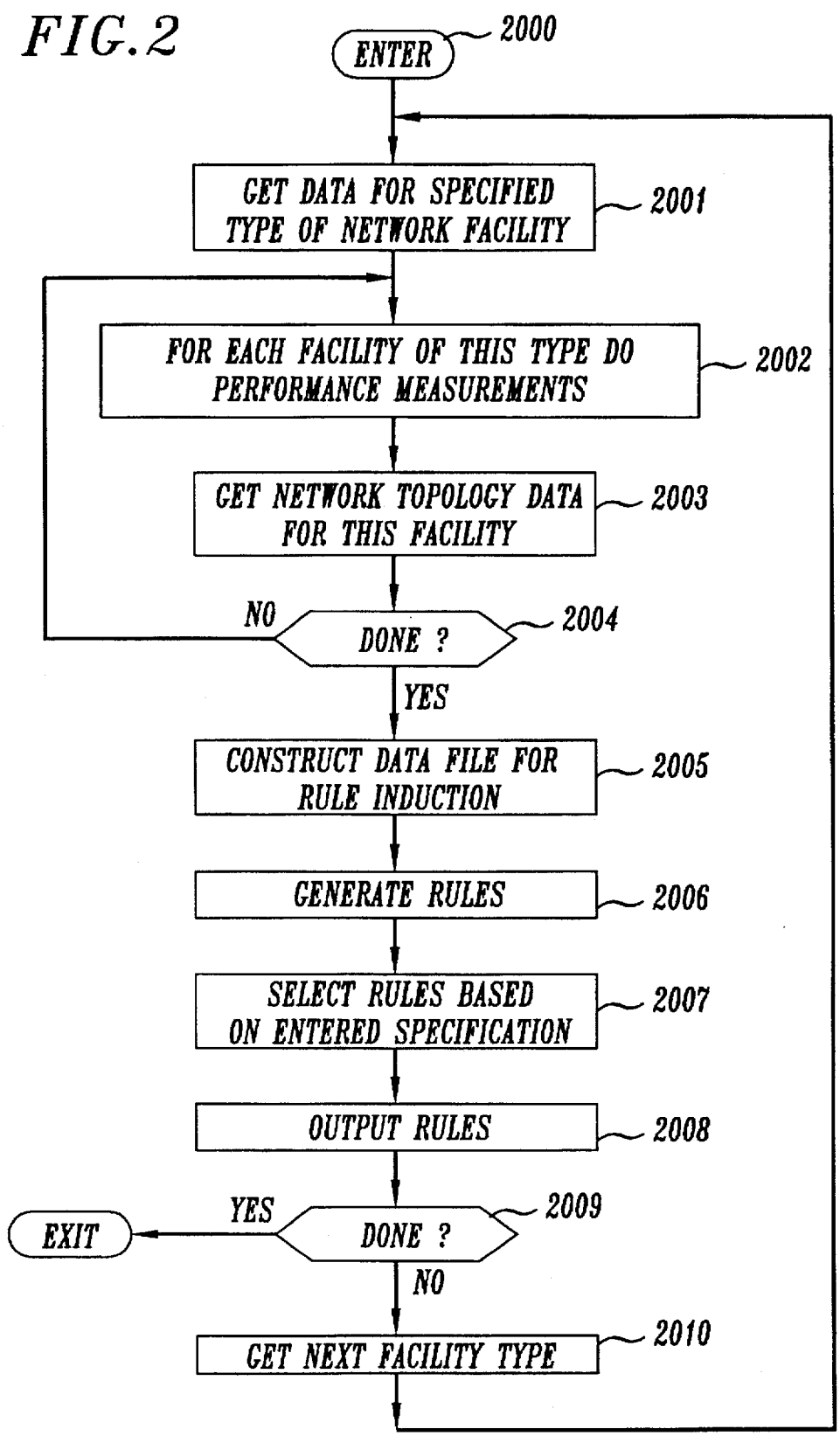

FIG. 3
TABLE A

SOME EXAMPLES OF PERFORMANCE MEASUREMENTS FOR FACILITIES WITH FAILURES:

| MEASUREMENT NAME | DESCRIPTION |
|---|---|
| ALRD | NUMBER OF TIME UNITS WITH ALARMS |
| ALRH | NUMBER OF TIME UNITS WITH ALARMS DURING THE LAST DAY |
| ERHD | NUMBER OF TIME UNITS WITH EXCEPTIONS OVER A THRESHOLD H |
| ERLD | NUMBER OF TIME UNITS WITH EXCEPTIONS OVER A THRESHOLD L |
| OFH | NUMBER OF TIME UNITS WITH OUT-OF-FRAME EXCEPTIONS OVER A THRESHOLD H |
| OFL | NUMBER OF TIME UNITS WITH OUT-OF FRAME EXCEPTIONS OVER A THRESHOLD L |
| FBL | NUMBER OF TIME UNITS WITH FRAMING BIT EXCEPTIONS OVER A THRESHOLD L |
| BVL | NUMBER OF TIME UNITS WITH BI-POLAR VIOLATIONS OVER A THRESHOLD L |
| SLL | NUMBER OF TIME UNITS WITH SLIPS OVER A THRESHOLD L |
| ALRCT | TOTAL NUMBER OF ALARMS |
| AVGAL | AVERAGE NUMBER OF ALARMS PER TIME UNIT WITH ALARM |
| OST | SECONDS FACILITY WAS OUT OF SERVICE |
| CT1 | TYPE OF CIRCUIT-DOMESTIC CIRCUIT |
| CT2 | TYPE OF CIRCUIT-INTERNATIONAL CIRCUIT |
| CT3 | TYPE OF CIRCUIT-PRIVATE LINES |

AUTOMATIC TEMPOROSPATIAL PATTERN ANALYSIS AND PREDICTION IN A TELECOMMUNICATIONS NETWORK USING RULE INDUCTION

This is a Continuation of Application Ser. No. 08/587,062 filed Jan. 16, 1996 now abandoned, which in turn is a continuation of application Ser. No. 08/140,780 filed Oct. 21, 1993, now abandoned.

FIELD OF THE INVENTION

The invention relates to processing data generated by a telecommunications network and applying the result of such processing to other network data to predict the possibility of a particular event happening in the network.

BACKGROUND OF THE INVENTION

A large telecommunications network typically generates a large number of reports over a short period of time, e.g., twenty-four hours. Such reports include data relating to, for example, telephone traffic, circuit alarms, etc. A Network Management System (NMS) associated with the telecommunications network accumulates and processes the data to track and manage the performance of the network. Such management includes (a) identifying and repairing network problems when they occur, and (b) trends in telephone traffic patterns. For example, consider the way in which an NMS processes trouble alarms, which may be classified as either transient or non-transient. Non-transient alarms are usually indicative of a "hard" fault. Transient alarms, on the other hand, are usually indicative of either a reoccurring and nonreoccurring network problem. A nonreoccurring alarm is usually the result of an inconsequential fault and, therefore, may be ignored. The reason for this is that a nonreoccurring alarm is most likely the result of some external condition, such as, for example, a strike of lightning, causing a momentary loss of a carrier signal at a point in the network. A reoccurring transient alarm, on the other hand, is usually indicative of a chronic problem, for example, a network facility or circuit that fails when particular conditions occur. Such a problem might affect the quality of telecommunications when it occurs.

In most instances, however, it is difficult to distinguish a chronic alarm from a transient, non-chronic alarm. Moreover, the majority of alarms that are generated in a telecommunications network are of the nonreoccurring type. Because of this, an NMS may spend an inordinate amount of time and resources attempting to identify the sources of respective nonreoccurring alarms, thereby possibly delaying the repair of chronic problems.

SUMMARY OF THE INVENTION

An advancement in the art of telecommunications is achieved by arranging an operations support system so that, in accord with an aspect of the invention, it generates a rule set from data generated by an associated telecommunications system and then applies the rule set to data subsequently generated by the telecommunications system to predict that a particular event(s) will likely occur in the system. In an illustrative embodiment of the invention, a set of predetermined measurements is generated for the data that is initially obtained from the telecommunications system and then supplied to a particular rule induction method which then generates a number of rules as a function of such measurements and selects a best rule set from the generated rules such that the selected rule set is capable of predicting accurately the occurrence of past events characterized by the data. The rule set is then used to predict future occurrences of the events.

BRIEF DESCRIPTION OF THE DRAWING

In the FIGS.:

FIG. 2 shows in flow chart form the program which implements the invention in the rule generator of FIG. 1, and FIG. 3 identifies different types of performance measurements used in the system of FIG. 1.

DETAILED DESCRIPTION

Figure 1:
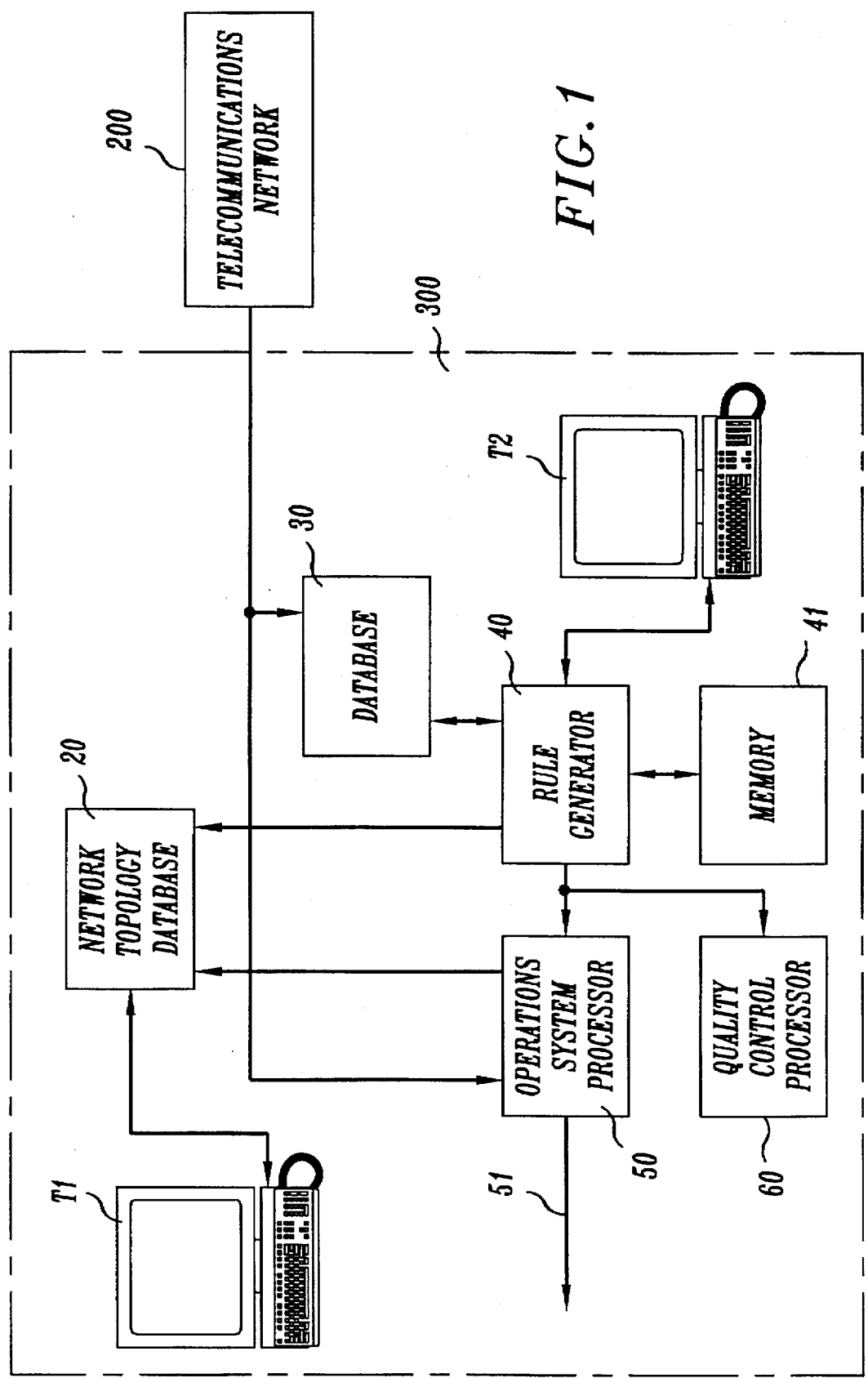
FIG. 1 shows a broad block diagram of an operations system.

Turning now to FIG. 1 there is shown a broad block diagram of a conventional telecommunications network 200 and operations support system 300. Operations support system 300, more particularly, supports the overall operation of network 200. One aspect of such support deals with tracking the performance of network 200 by accumulating and processing alarm messages generated by individual facilities comprising network 200. An alarm message may be generated by a facility as a result of one of a number of different conditions. Such conditions include (a) a spurious problem that occurs for just a short period of time, (b) a chronic problem that occurs periodically, but which can cause an associated facility to slowly degrade over time, (c) a "hard" failure which may cause the associated facility to become inoperable, etc. The number of such alarms that network 200 may generate within a particular period of time, e.g., 24 hours, could be very high. Such alarms are accumulated by system 300 and stored in database 30. An alarm message includes information identifying a particular problem and the identity of the network 200 facilities that might be affected by the problem.

The alarm messages that are stored in database 30 may be accessed by facility type. For example, all alarm messages associated with a particular type of facility, such as echo cancelers, may be accessed by presenting a request identifying the particular type of facility type to database 30. Such access may be refined by also specifying a particular period of time in the request. In response to the request, database 30 outputs an alarm message that occurred over the specified period of time for the identified type of facility.

One dilemma that an operations support system faces is which of the large number of alarms that are generated on a daily basis should be addressed first. It is apparent that alarms that are generated as a result of a "hard" fault are usually easy to identify and are addressed first. However, the majority of alarms that are generated daily are typically due to spurious conditions and chronic problems. Moreover, it is difficult to determine initially whether an alarm occurred as a result of a spurious condition or a chronic problem. As such, much effort is sometimes directed to tracking down the cause of spurious alarms since they comprise the majority of alarms that occur each day. Accordingly, alarms identifying a chronic problem may not be dealt with until the facility generating such alarms degrades to a hard fault.

Recognizing that problem, we have adapted an operations support system so that it processes alarms to identify chronic problems and prioritize the repair of those problems. To that end, Operations Support System (OSS) 300 includes rule generator 40 and operations system processor 50 which operate in accordance with the invention to identify and prioritize chronic problems. More particularly, role generator 40, which may be, for example, embodied in a SPARC station 2 available from Sun Microsystems, Inc., responds to receipt of a command from an external source, e.g., terminal T2, by sending an access request identifying a facility type and period of time to database 30. As mentioned above, database 30, in response to such a request, outputs all alarm messages that occurred over the specified period of time for the type of facility identified in the request, in which the facility type may be, for example, echo cancelers, T1 carriers, T3 carriers, toll switches, etc. The specified period of time is typically one to several weeks and may be identified by a starting date and an ending date.

Assuming that the requested period of time equals two weeks and the facility type is T1 carriers, then the number of alarm messages of the requested type that database 30 outputs could be very large if network 200 employs an appreciable number of T1 carriers. Upon receipt of the alarm messages, rule generator 40 stores them in its associated memory 41 such that alarm messages associated with a specific facility are stored in a respective memory array. When all such messages have been received from database 30 and stored in memory 41, then rule generator 40 processes the messages and generates, in accord with an aspect of the invention, a set of rules which may be applied to identify which of the alarms stored in memory 41 are indicative of respective chronic problems. The rules are then passed to operations system processor 50, which then applies the rules to alarm messages associated with the same type of facility, but occurring thereafter. Such rules are also passed to processor 60, as discussed below.

The program which controls the operation of rule generator 40 to generate a particular set of rules for the processing of alarm messages is shown in flow chart form in FIG. 2. Specifically, the program is entered at block 2000 responsive to receipt of the aforementioned command. At block 2000, the program proceeds to block 2001 where it forms a request message containing the identity of the facility type and particular period of time, as discussed above. The program then supplies the message to database 30. As mentioned above, database 30, in turn, (a) unloads the alarm messages from its associated memory for the specified facility type and for the specified period of time and (b) passes them to rule generator 40. Rule generator 40, in turn and under control of the program, stores the messages in associated memory 41, as mentioned above. When such alarm messages have been so stored, the program then proceeds to block 2002. (Hereinafter the term "alarm" may also be referred to as an event.)

At block 2002, the program processes the stored messages to obtain a number of different performance measurements for each facility of the specified type. The measurements summarize spatial and temporal information about a facility and associated problems. Such measurements may include the number of (a) different types of alarm messages that occurred for the specific facility, (b) times an alarm (event) occurred during a unit of time for the facility, (c) units of time or (d) the location of the facility, during which the alarm (event) occurred. As will be discussed below, such measurements are determined for first and second windows, W1 and W2, comprising the aforementioned specified period of time. In addition, each window is partitioned into units of time for the purpose of performing such measurements. (An illustrative list of such performance measurements, or features, is shown in FIG. 3)

Specifically, the program blocks 2002 associated with the specified facility. Once it identifies such messages, then the program generates the different performance measurements for each window, W1 and W2, and for the units of time associated with those windows. In addition, the program accesses database 20 to determine the circuit layout for the facility within network 200. The circuit layout includes the identities of the other network 200 elements that may be connected directly to the facility. The program then performs the same processing steps for a next facility of the specified type. The program exits the do loop and proceeds to block 2005 upon processing the alarm messages for all of the facilities of the specified type.

At block 2005 the program builds a data file, in which a record of the data file comprises a number of fields for entering respective performance measurements derived for a specific facility and the circuit layout for the facility. The data file also includes a header which identifies the fields forming a record and identifies the contents of the fields. The program proceeds to block 2006 once it has completed the building of the data file. At block 2006, the program enters a rule generation program, which processes the data file using rule induction methods to generate a set of rules for the specified type of facility. For example, a set of rules of the form "if A is >B, then choose class 1", where A may represent a performance measurement, B may represent a particular value and class 1 may represent a chronic problem.

(It is noted that the rule induction program represented by block 2006 follows the rule induction technique disclosed in an article entitled "Reduced Complexity Rule Induction", by S. Weiss and N. Indurkhya and published in the *Proceedings of the International Joint Conference on Artificial Intelligence (IJCAI)*, Sydney, Australia, 1991, pages 678–684, which is hereby incorporated by reference. Alternatively, a number of rule induction programs are commercially available, such as the C4.5 program available from Morgan Kaufmann Publishers, San Mateo, Calif., U.S.A.).

Briefly, rule induction methods attempt to find a compact rule set that completely covers and separates various classes of data, e.g. alarm messages respectively relating to spurious and chronic problems. A covering set of rules is found by heuristically searching for a single best rule that covers different cases, e.g., records in the data file, for only one class. Once a best conjunctive rule is found for a particular class e.g., chronic or nonchronic problems, the rule is then added to the rule set and the cases satisfying it are removed from further consideration. This process is repeated until there are no remaining cases to be covered. Once a covering rule set is found that separates the classes, the induced set of rules is further refined by using either pruning or statistical techniques. The initial covering rule set is then scaled back to the most statistically accurate subset of rules using training and testing evaluation methods.

When the program has generated a number of sets of rules, it applies those rule sets to the test data portion of the data file generated at block 2005. In doing so, it prunes the rule sets so that an error rate defining the accuracy of each rule set may be minimized when applied to the test data. That is, the program strives to improve the accuracy of a rule set to predict the occurrence of chronic as well as nonchronic alarms. Following the foregoing, the program then proceeds to block 2007.

The program at block 2007 selects a rule set from the sets of rules generated at block 2006, in which the selection is based on a specification provided by an external source, for example, a user or another program. Such a specification may request a rule set having a particular predictive accuracy for a certain class of problems, such as chronic problems. The specification may also include coverage for a particular class of problems. Coverage as defined herein is a measure of the range of particular problems, e.g., chronic problems, that a rule set can predict accurately. For example, the following illustrates one possible rule set:

If ( $ALRD > x_1$ $FBL > x_2$ $SLL > x_3$ $OFL > x_4$ or $BVL > x_5$) then choose chronic;

where $x_1$ through $x_5$ are particular values that are generated by the rule generator. The coverage of the above rule set may be increased by adding, for example, the following rule to form a rule set of 2.

If ($CT2$ & $ALRCT > x_6$ & $ALRH > x_7$) then choose chronic; where $x_6$ and $x_7$ are also values generated by the rule generator.

It is noted, however, that increasing the coverage of a rule set may lead to a decrease in the predictive accuracy of the rule set. The reason for this is that as the number of cases that are covered increases it is likely that errors will occur.

When the program at block 2007 selects a rule set in accordance with the externally provided specification, it then proceeds to block 2008, where it outputs the rule set to processor 50 and processor 60. The program then proceeds to block 2009 where it checks to see it is done, that is, if the program has been directed to generate a rule set for another type of facility. If that is the ,case, then the program proceeds to block 2010 where it obtains the identity for the specified facility and then returns to block 2001. Otherwise, the program exits.

Returning to FIG. 1, operations system processor 50 applies the rule set to new alarm messages that it obtains from communications network 200 so that it can accurately predict the occurrence of a particular chronic problem and output a message to that effect via path 51. In this way, processor 50 may direct attention away from spurious problems (nonchronic problems) and focus attention on chronic problems so that such problems may be dealt with before they degrade into a hard fault.

The rule set outputted by rule generator 40 may also be used to predict trends in the occurrence of chronic problems. Quality control processor 60 uses the rule set to determine such trends, and uses the trends in conjunction with other quality control criteria, e.g., the rate at which chronic problems are being repaired, to evaluate the performance of network 200. For example, if a trend indicates that a particular section of network 200 may exceed its number of allowable chronic problems for given period of time, then processor 60 uses that trend to output a performance value for that section of network 200.

As mentioned above, rule induction can be applied to other applications as a way of generating rule sets for those applications. For example, one application may be traffic data in which rule induction may be applied to such data to generate a set of rules that may be used to predict particular trends in future traffic patterns. In particular, traffic data may be collected over period of time and stored in a database, e.g., database 30. The above-described program at block 2001 (FIG. 2) may then access that data as well as data indicative of the topology of the network in the manner discussed above. The program may then divide the traffic data into respective windows W1 and W2, and then generate a rule set for the data. The measurements made in W1 are used to predict the measurements in W2. If the prediction is accurate, then the rule set may be used to predict future traffic patterns, in which such patterns may be, for example, predicting appropriate levels of blocking for particular telephone mutes.

As another example, when a disaster strikes a particular area, e.g., a hurricane, particular controls are activated to automatically block low priority calls so that such calls do not impact the processing and routing of high priority calls. The levels of such controls can be predicted accurately by processing traffic data accumulated during a previous disaster, in accord with the invention, to generate a rule set that can be used to predict such levels of control.

The foregoing is merely illustrative of the principles of the invention. Those skilled in the art will be able to devise numerous arrangements, which, although not explicitly shown or described herein, nevertheless embody those principles that are within the spirit and scope of the invention.

We claim:

1. A method of processing particular data generated by a telecommunications system, said particular data being indicative of different types of events that occurred in said telecommunication system, said method comprising the steps of:

obtaining said particular data from said telecommunications system, segmenting said particular data into a plurality of groups, processing said particular data contained within at least a first group of said plurality of groups and automatically generating values for respective predetermined measurements, independently generating at least one rule set as a function of said predetermined measurements, and processing said particular data in said first group using said at least one rule set to identify said different types of events and to predict measurements in at least a second group.

2. The method set forth in claim 1 further comprising the step of applying said at least one rule set to data currently generated by said telecommunications system to determine if individual ones of said different types of events are likely to occur subsequently.

3. The method set forth in claim 1 wherein said step of generating includes the step of generating a plurality of rule sets and selecting as said at least one rule set that one of said plurality of rule sets which meets a predetermined specification.

4. The method set forth in claim 3 wherein said predetermined specification includes a predetermined level of accuracy and a predetermined level of coverage.

5. The method set forth in claim 3 wherein said step of generating includes the steps of generating a data file comprising said predetermined measurements, and supplying said data file to a rule induction generator to generate said plurality of rule sets.

6. The method set forth in claim 1 wherein said different types of events include chronic problems identified by respective alarm conditions that occurred in said telecommunications system.

7. The method set forth in claim 1 wherein said particular data defines different traffic patterns within said telecommunications system.

8. The method set forth in claim 1 wherein said step of generating includes the step of supplying said at least one rule set to an operations system processor so that said operations system processor may use said at least one rule set to identify chronic problems when they occur in said communications system.

9. The method set forth in claim 1, wherein said step of generating includes the step of supplying said at least one rule set to a quality control processor so that said quality control processor may predict trends in the occurrence of said different types of events.

10. The method set forth in claim 1 wherein said particular data is service provisioning information associated with a particular service feature provided by said telecommunications system.

* * * * *